US011856450B2

(12) United States Patent
Damnjanovic et al.

(10) Patent No.: US 11,856,450 B2
(45) Date of Patent: Dec. 26, 2023

(54) RANGE EXTENSION FOR RADIO LINK CONTROL STATUS REPORTING

(71) Applicant: QUALCOMM Incorporated, San Diego, CA (US)

(72) Inventors: Jelena Damnjanovic, Del Mar, CA (US); Tao Luo, San Diego, CA (US); Juan Montojo, San Diego, CA (US); Kausik Ray Chaudhuri, San Diego, CA (US); Atanu Basudeb Halder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/167,843

(22) Filed: Feb. 4, 2021

(65) Prior Publication Data

US 2021/0274379 A1    Sep. 2, 2021

Related U.S. Application Data

(60) Provisional application No. 62/982,630, filed on Feb. 27, 2020.

(51) Int. Cl.
| | |
|---|---|
| *H04W 28/04* | (2009.01) |
| *H04L 1/1607* | (2023.01) |
| *H04W 76/27* | (2018.01) |
| *H04W 80/02* | (2009.01) |

(52) U.S. Cl.
CPC .......... *H04W 28/04* (2013.01); *H04L 1/1642* (2013.01); *H04W 76/27* (2018.02); *H04W 80/02* (2013.01)

(58) Field of Classification Search
CPC ..... H04W 28/04; H04W 76/27; H04W 80/02; H04W 24/10; H04W 72/042; H04W 72/23; H04L 1/1642; H04L 1/0026
See application file for complete search history.

(56) References Cited

U.S. PATENT DOCUMENTS

| | | | |
|---|---|---|---|
| 2016/0212661 A1 | 7/2016 | Basu Mallick et al. | |
| 2017/0041944 A1* | 2/2017 | Yang | H04W 28/0236 |
| 2018/0227086 A1* | 8/2018 | Deng | H04L 1/1864 |
| 2018/0324637 A1* | 11/2018 | Deng | H04W 28/04 |
| 2020/0351725 A1* | 11/2020 | Kim | H04W 36/0069 |

(Continued)

OTHER PUBLICATIONS

3GPP TS 38.322 V15.0.0 (Dec. 2017), 3rd Generation Partnership Project; Technical Specification Group Radio Access Network; NR; Radio Link Control (RLC) protocol specification; (Release 15). (Year: 2017).*

(Continued)

*Primary Examiner* — Mohammed S Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive radio resource control (RRC) signaling that indicates to configure the UE with one or more formats for transmitting a radio link control (RLC) status report. The (Continued)

UE may transmit the RLC status report using an indicated format, of the one or more formats or an additional format for transmitting the RLC status report, wherein use of the indicated format is based at least in part on a physical layer indication or a medium access control (MAC) layer indication. Numerous other aspects are described.

30 Claims, 10 Drawing Sheets

(56) References Cited

U.S. PATENT DOCUMENTS

| | | | | |
|---|---|---|---|---|
| 2021/0036812 | A1* | 2/2021 | Dudda | H04L 1/1867 |
| 2021/0051611 | A1* | 2/2021 | Xu | H04W 56/00 |
| 2021/0075547 | A1* | 3/2021 | Tao | H04L 1/188 |
| 2021/0377757 | A1* | 12/2021 | Liu | H04L 1/1858 |
| 2021/0400528 | A1* | 12/2021 | Li | H04L 1/18 |
| 2022/0038968 | A1* | 2/2022 | Latheef | H04W 36/0058 |
| 2022/0173837 | A1* | 6/2022 | Kainulainen | H04L 1/1829 |

OTHER PUBLICATIONS

3GPP TSG-RAN WG2 #99bis; Tdoc R2-1711250; Source: Ericsson; Title: RLC Status Report format and Polling; Prague, Czech Republic, Oct. 9-13, 2017 (Year: 2017).*
3GPP TSG-RAN WG2 Meeting #99bis; R2-1711789; Source: Samsung; Title: Presence of E1 in RLC Status Report; Prague, Czech Republic, Oct. 9-13, 2017 (Year: 2017).*
3GPP TSG-RAN WG2 #99bis; R2-1711268, Source: Nokia, Nokia Shanghai Bell; Title: Remaining details of RLC Status PDU format; Prague, Czech Republic, Oct. 9-13, 2017 (Year: 2017).*
International Search Report and Written Opinion—PCT/US2021/016896—ISA/EPO—dated May 19, 2021.
Samsung : "NACK SN Range and Detail in RLC Status Report", 3GPP Draft, 3GPP TSG-RAN WG2 Meeting #99, R2-1709035, RLC Status PDU, 3rd Generation Partnership Project (3GPP), Mobile Competence Centre, 650, Route Des Lucioles, F-06921 Sophia-Antipolis Cedex, France, vol. RAN WG2, No. Berlin, Germany, Aug. 21, 2017-Aug. 25, 2017, Aug. 20, 2017 (Aug. 20, 2017), XP051318828, 5 Pages, Retrieved from the Internet: URL: http://www.3gpp.org/ftp/Meetings_3GPP_SYNC/RAN2/Docs/. [retrieved on Aug. 20, 2017] figures 1-4 sections: 1, 2.1, 2.2; p. 1-p. 3.

* cited by examiner

RANGE EXTENSION FOR RADIO LINK CONTROL STATUS REPORTING

CROSS-REFERENCE TO RELATED APPLICATION

This patent application claims priority to Provisional Patent Application No. 62/982,630, filed on Feb. 27, 2020, entitled "RANGE EXTENSION FOR RADIO LINK CONTROL STATUS REPORTING," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for range extension for radio link control (RLC) status reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving radio resource control (RRC) signaling that indicates to configure the UE with one or more formats for transmitting a radio link control (RLC) status report; and transmitting the RLC status report using an indicated format, of the one or more formats or an additional format for transmitting the RLC status report, wherein use of the indicated format is based at least in part on a physical layer indication or a medium access control (MAC) layer indication.

In some aspects, a UE for wireless communication includes a memory; and one or more processors operatively coupled to the memory, the memory and the one or more processors configured to: receive RRC signaling that indicates to configure the UE with one or more formats for transmitting a RLC status report; and transmit the RLC status report using an indicated format, of the one or more formats or an additional format for transmitting the RLC status report, wherein use of the indicated format is based at least in part on a physical layer indication or a MAC layer indication.

In some aspects, a non-transitory computer-readable medium storing a set of instructions for wireless communication includes one or more instructions that, when executed by one or more processors of a UE, cause the UE to: receive RRC signaling that indicates to configure the UE with one or more formats for transmitting a RLC status report; and transmit the RLC status report using an indicated format, of the one or more formats or an additional format for transmitting the RLC status report, wherein use of the indicated format is based at least in part on a physical layer indication or a MAC layer indication.

In some aspects, an apparatus for wireless communication includes means for receiving RRC signaling that indicates to configure the UE with one or more formats for transmitting a RLC status report; and means for transmitting the RLC status report using an indicated format, of the one or more formats or an additional format for transmitting the RLC status report, wherein use of the indicated format is based at least in part on a physical layer indication or a MAC layer indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
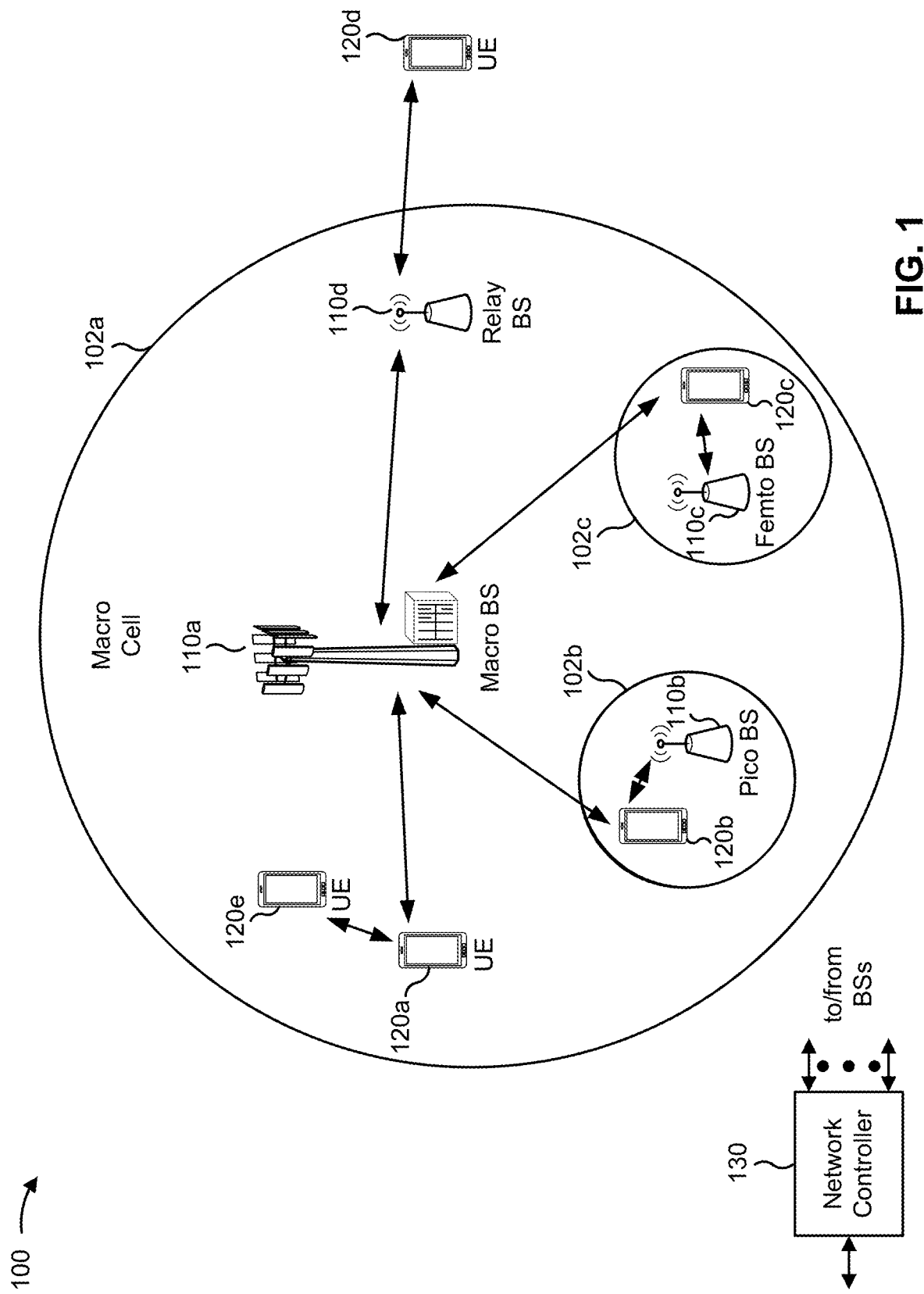
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
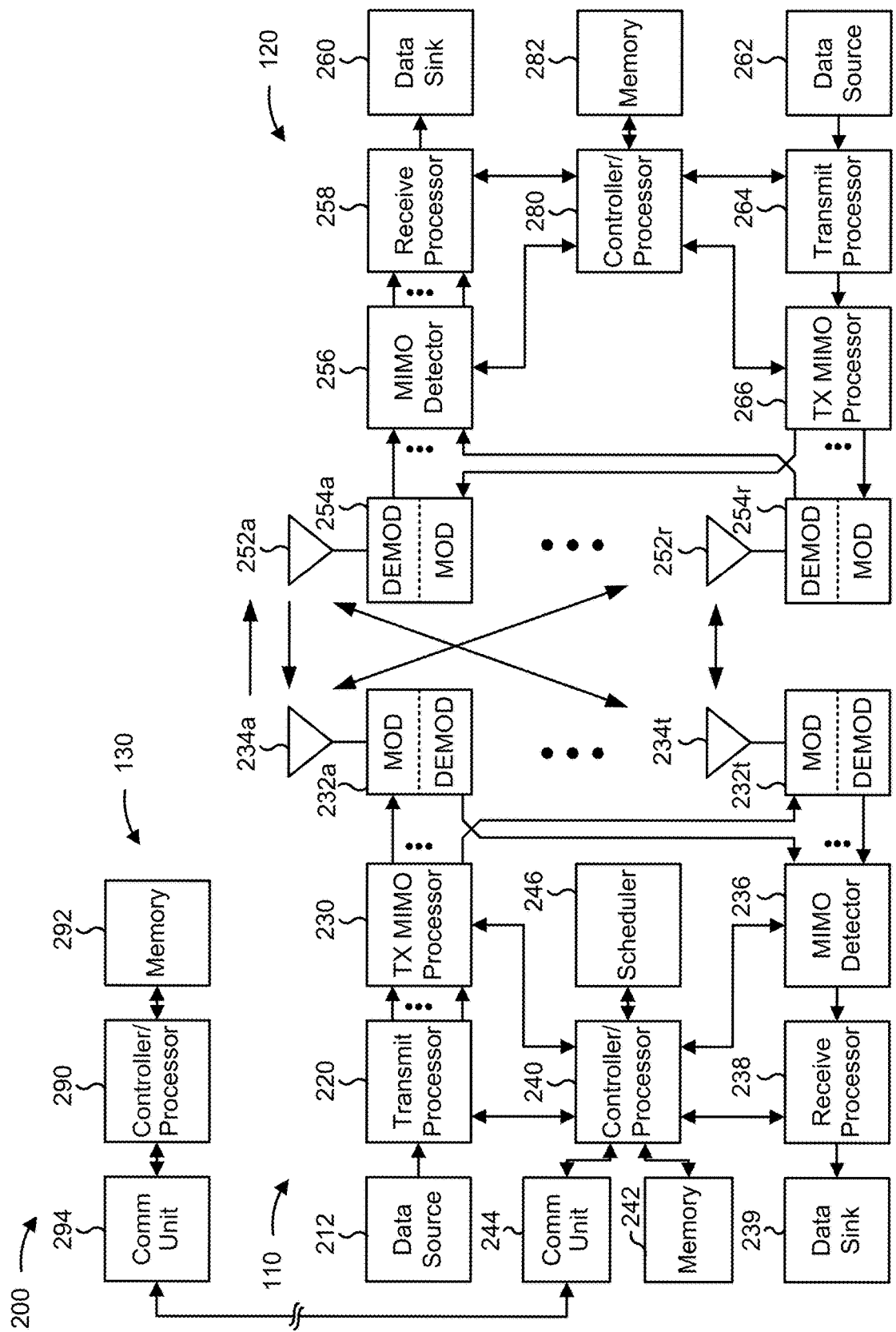
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulated reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-10

Controller/processor 240 of base station 110, controller/processor 280 of UE 120, and/or any other component(s) of FIG. 2 may perform one or more techniques associated with range extension for RLC status reporting, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, FIG. 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, FIG. 1000 of FIG. 10, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, the UE includes means for receiving RRC signaling that indicates to configure the UE with one or more formats for transmitting a RLC status report; or means for transmitting the RLC status report using an indicated format, of the one or more formats or an additional format for transmitting the RLC status report, wherein use of the indicated format is based at least in part on a physical layer indication or a MAC layer indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting the RLC status report using a MAC layer signaling format.

In some aspects, the UE includes means for receiving one or more MAC control elements that include the MAC layer indication, or means for receiving downlink control information that includes the physical layer indication.

In some aspects, the UE includes means for transmitting one or more additional RLC status reports using the indicated format based at least in part on the physical layer indication or the MAC layer indication.

In some aspects, the UE includes means for receiving an indication to use a different format for transmitting a subsequent RLC status report.

In some aspects, the UE includes means for transmitting a request to change from the indicated format for transmitting the subsequent RLC status report, wherein reception of the indication to use the different format for transmitting the subsequent RLC status report is based at least in part on transmission of the request to change from the indicated format for transmitting the subsequent RLC status report.

In some aspects, the UE includes means for configuring the UE, based at least in part on receiving the RRC signaling, with the one or more formats.

In some aspects, the UE includes means for generating the RLC status report having the indicated format based at least in part on receiving the physical layer indication or the MAC layer indication.

As indicated above, FIG. 2 is provided as an example. Other examples may differ from what is described with regard to FIG. 2.

Figure 3:
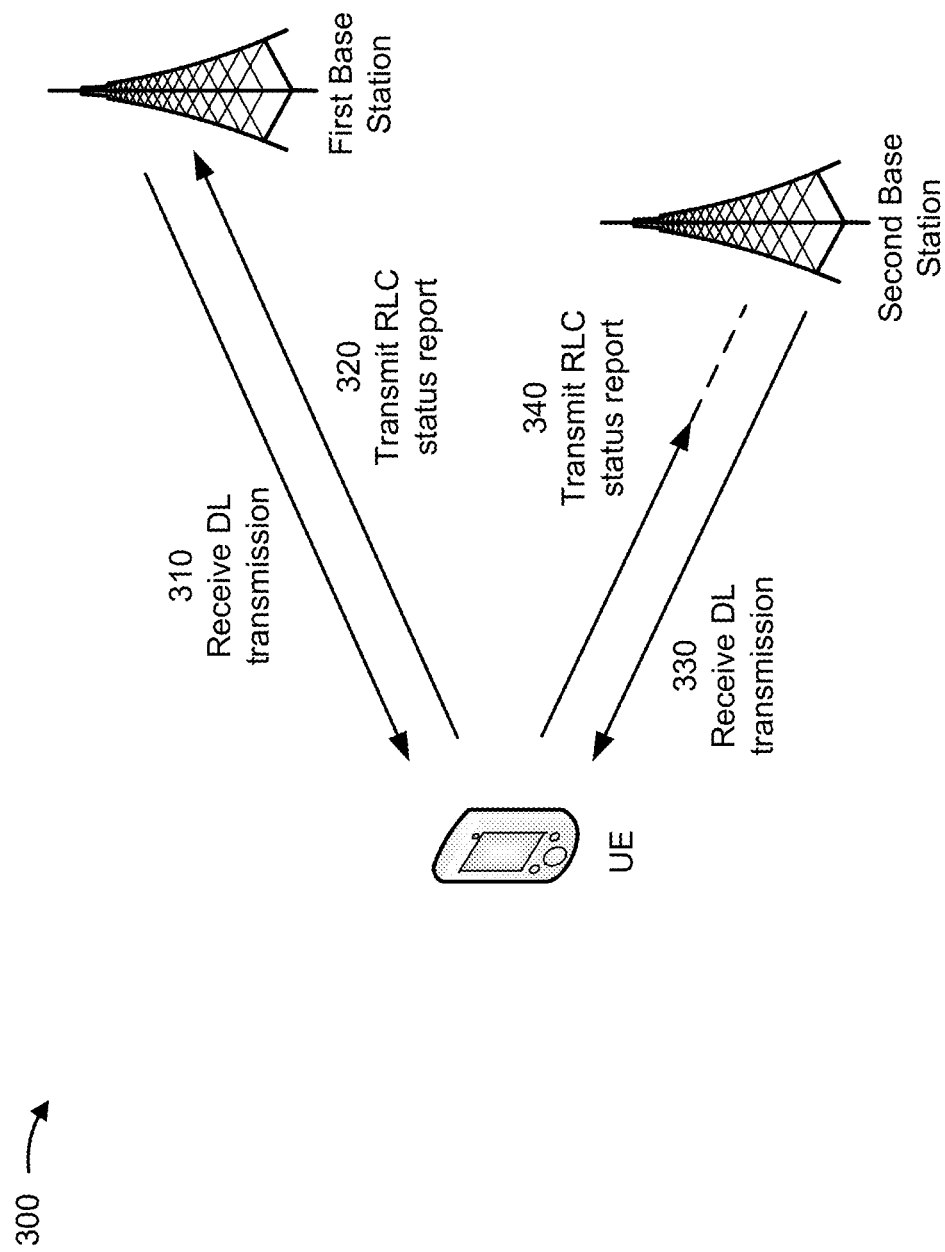
FIG. 3 is a diagram illustrating an example of transmitting an RLC status report in a dual connectivity environment, in accordance with the present disclosure.

FIG. 3 is a diagram illustrating an example 300 of transmitting an RLC status report in a dual connectivity environment, in accordance with the present disclosure. As shown, a UE, a first base station, and a second base station may communicate using one or more of downlink transmissions and uplink transmissions. In some aspects, the base station and the UE may be part of a wireless network.

The UE may communicate with the first base station using a first cell group (e.g., a master cell group (MCG)) and may communicate with the second base station using a second cell group (e.g., a secondary cell group (SCG)). In some aspects, the UE may communicate using the MCG over one or more frequency bands on frequency range 1 (e.g., FR1) or other relatively low frequency bands (e.g., Sub-6 GHz frequency bands). In some aspects, the UE may communicate with the second base station using the SCG over one or more frequency bands on frequency range 2 (e.g., FR2) or other relatively high frequency bands (e.g., millimeter wave frequency bands).

As shown in FIG. 3, and by reference number 310, the UE may receive one or more downlink transmissions from the first base station. In some aspects, the UE may receive the one or more downlink transmissions from the first base station using the MCG over one or more frequency bands on FR1.

As shown by reference number 320, the UE may transmit an RLC status report to the first base station. The RLC status report may include automatic repeat request (ARQ) feedback associated with the one or more downlink transmissions received from the first base station. In some aspects, a transmission range of the RLC status report to the first base station may be relatively high based at least in part on using a relatively low frequency band for the uplink transmission.

As shown by reference number 330, the UE may receive one or more downlink transmissions from the second base station. In some aspects, the UE may receive the one or more downlink transmissions from the first base station using the MCG over one or more frequency bands on FR2.

As shown by reference number 340, the UE may transmit an RLC status report to the second base station. The RLC status report may include ARQ feedback associated with the one or more downlink transmissions received from the second base station. In some aspects, a transmission range of the RLC status report to the second base station may be relatively low based at least in part on using a relatively high frequency band for the transmission. In some aspects, the UE may transmit the RLC status report to the second base station with a limited transmission power (e.g., based at least in part on a maximum permissible exposure (MPE) requirement, a configuration of the UE, and/or the like). In some aspects, the second base station may be out of range of the UE for the transmission of the RLC status report to the second base station. This may cause a failure to receive ARQ feedback, which may cause the base station to assume either an acknowledgement (ACK) or a negative acknowledgement (NACK) for the one or more downlink transmissions. This may consume computing, communication, and/or network resources to unnecessarily retransmit the one or more downlink transmissions (e.g., based at least in part on an incorrect assumption of a NACK) or to detect and recover from an assumption of an ACK when the UE did not receive the one or more downlink transmissions.

As indicated above, FIG. 3 is provided as an example. Other examples may differ from what is described with respect to FIG. 3.

In some aspects described herein, a UE may transmit an RLC status report or information of the RLC status report with an extended transmission range. In some aspects, the UE may be configured with one or more formats for transmitting and RLC status report (e.g., based at least in part on RRC signaling). In some aspects, the UE may receive a physical layer indication or a MAC layer indication (e.g., via one or more MAC CEs, downlink control information (DCI), and/or the like) that indicates one of the one or more formats, or a new format, to use for transmitting the RLC status report. For example, the UE may receive the physical layer indication or the MAC layer indication with an indication to transmit the RLC status report with a format that is configured to indicate a sequence number of a downlink transmission using a 12-bit sequence number (e.g., instead of using an 18-bit sequence number). The UE may transmit the RLC status report using the indicated format. In some aspects, using a relatively small number of bits to indicate sequence numbers of downlink transmissions within the RLC status report may decrease a payload of the RLC status report and increase a transmission range. In this way, the base station may receive the RLC status report when the UE is outside of a transmission range for transmitting the RLC status report with a relatively large payload. This may conserve computing, communication, and/or network resources that may otherwise be consumed based at least in part on the base station making an incorrect assumption of ARQ feedback.

In some aspects described herein, a UE may be configured to selectively transmit information of an RLC status report via an RLC control packet data unit (PDU) or via a MAC CE. In some aspects, the UE may reduce and/or compress the information of the RLC status report to transmit via the MAC CE, which may decrease a payload of a transmission with the information of the RLC status report. This may increase a transmission range of the UE for transmitting the information of the RLC status report. In this way, the base station may receive the RLC status report when the UE is outside of a transmission range for transmitting the RLC status report using an RLC control PDU, which may conserve computing, communication, and/or network resources that may otherwise be consumed based at least in part on the base station making an incorrect assumption of ARQ feedback.

Figure 4:
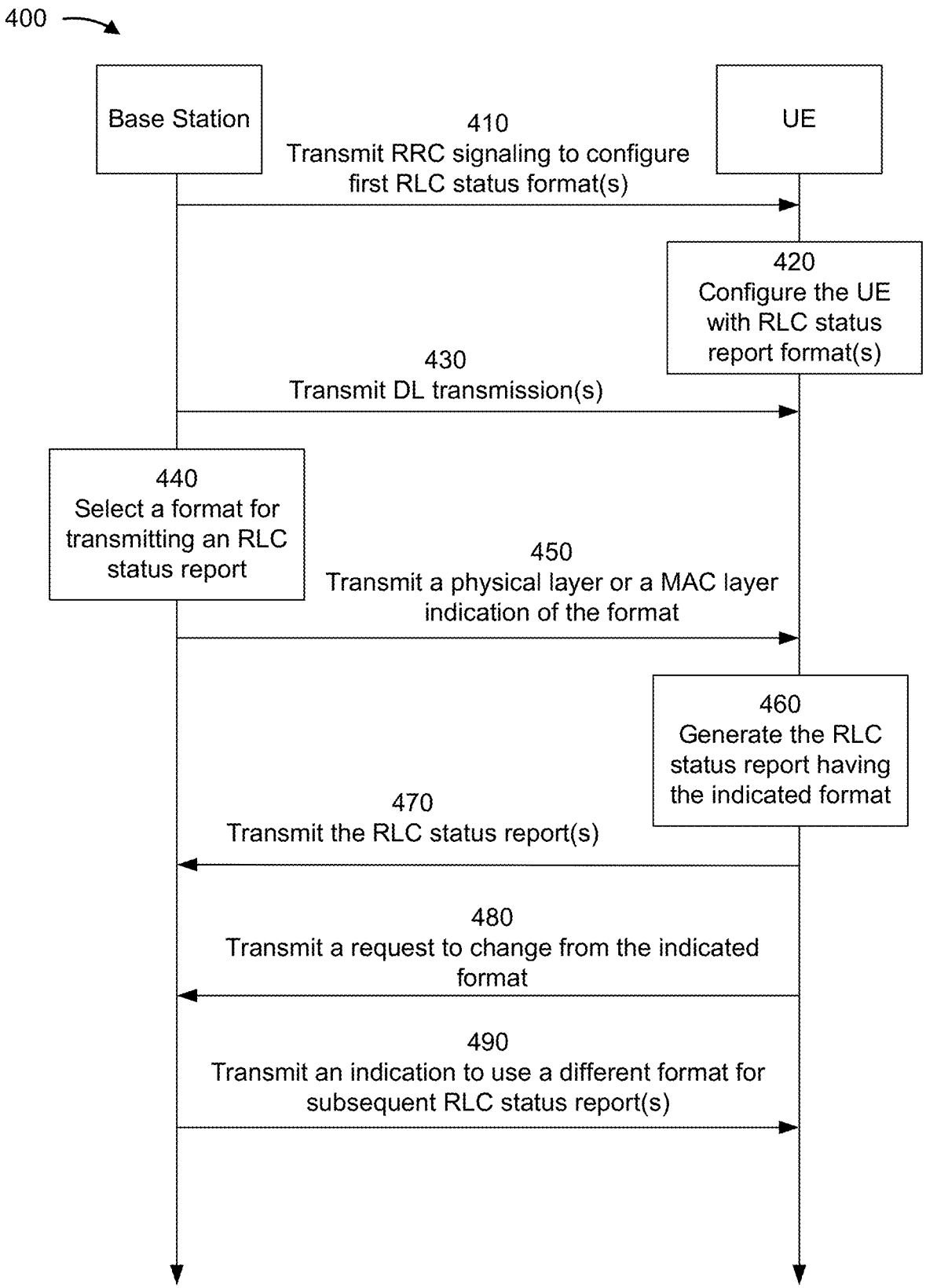
FIG. 4 is a diagram illustrating an example of range extension for RLC status reporting, in accordance with the present disclosure.

FIG. 4 is a diagram illustrating an example 400 of range extension for RLC status reporting, in accordance with the present disclosure. As shown, a UE (e.g., UE 120) and a base station (e.g., base station 110) may communicate using one or more of downlink transmissions and uplink transmissions. In some aspects, the base station and the UE may be part of a wireless network (e.g., the wireless network 100). In some aspects, the UE and the base station may communicate using a cell group over one or more frequency bands on FR2 or other relatively high frequency bands. In some aspects, a downlink transmission range using the cell group may be greater than an uplink transmission range using the cell group (e.g., based at least in part on an MPE requirement, a configuration of the UE, and/or the like).

As shown in FIG. 4, and by reference number 410, the base station may transmit, and the UE may receive, RRC signaling to configure one or more formats for transmitting an RLC status report for the UE. For example, the RRC signaling may indicate at least one first format for transmitting an RLC status report (e.g., an 18-bit sequence number to identify downlink transmissions, a 12-bit sequence number to identify downlink transmissions, and/or the like) to be configured for the UE.

As shown by reference number 420, the UE may configure the UE with the one or more formats for transmitting an RLC status report. For example, the UE may be configured to transmit RLC status reports using one of the one or more formats unless the base station transmits an indication to use a different format than the one or more format. In some aspects, the UE may be configured to transmit RLC status reports using any one of the one or more formats and may be configured to select the one of the one or more formats based at least in part on a physical layer indication or a MAC layer indication.

As shown by reference number 430, the base station may transmit one or more downlink transmissions to the UE. The one or more downlink transmissions may include one or more control plane downlink transmissions (e.g., RLC downlink transmissions), one or more user plane downlink transmissions, and/or the like. The UE may attempt to receive the one or more downlink transmissions and may determine ARQ feedback (e.g., ACKs or NACKs) for the one or more downlink transmissions. In some aspects, the UE may generate information of an RLC status report for transmission to the base station to indicate the ARQ feedback.

As shown by reference number 440, the base station may select a format for transmitting an RLC status report (e.g., for the UE to use for transmitting one or more RLC status reports). In some aspects, the base station may select the format based at least in part on a downlink data rate for downlink transmissions to the UE, an estimated size of the RLC status report, an RLC packet error rate for downlink transmissions to the UE, uplink transmission conditions, and/or the like. In some aspects, the base station may select the format from the one or more formats for transmitting an RLC status report identified in the RRC signaling. In some aspects, the base station may select a new format that is not identified in the RRC signaling. In other words, the base station may select a format (e.g., configured to indicate a sequence number of a downlink transmission using an 18-bit sequence number, configured to indicate a sequence number of a downlink transmission using a 12-bit sequence number, and/or the like) that the UE is configured to use based at least in part on the RRC signaling, or may select a new format that the UE is not yet configured to use (e.g., with the base station transmitting information for the UE to configure the UE to use the new format).

In some aspects, a relatively small downlink data rate may indicate that fewer NACKs (with indications of sequence numbers) may be included in the RLC status report. This may indicate a reduced payload of the RLC status report without selecting a relatively small bit number for sequence numbers to identify downlink transmissions. Similarly, the base station may estimate a size of the RLC status report (e.g., based at least in part on prior RLC status reports) and select a format based at least in part on the estimated size of the RLC status report. For example, if the base station estimates the size of the RLC status report as relatively large, the base station may select a format that may reduce a size of the RLC status report (e.g., with a relatively small bit count for sequence numbers).

In some aspects, the base station may select a format based at least in part on an RLC packet error rate for downlink transmissions to the UE. For example, based at least in part on determining that the RLC packet error rate is relatively high (e.g., indicating that a payload of the RLC status report may be relatively high), the base station may select a format that reduces a size of the RLC status report (e.g., with a relatively small bit count for sequence numbers). Similarly, the base station may select a format based at least in part on uplink channel conditions. For example, based at least in part on determining that the uplink channel conditions are relatively good (e.g., as measured by the base station), the base station may select a format that does not reduce a size of the RLC status report (e.g., with a relatively large bit count for sequence numbers).

As shown by reference number 450, the base station may transmit a physical layer indication or a MAC layer indication of the format (e.g., the selected format). In some aspects, the base station may transmit, and the UE may receive, the physical layer indication or the MAC layer indication of the format via one or more MAC CEs, DCI (e.g., in a DCI message), and/or the like. In some aspects, the base station may transmit the physical layer indication or the MAC layer indication of the format to dynamically configure the UE to use the indicated format. In some aspects, the base station may transmit the physical layer indication or the MAC layer indication of the format to semi-statically configure the UE to use the indicated format (e.g., to use an indicated format for subsequent RLC status reports until a change of formats is indicated in a subsequent physical layer indication, a subsequent MAC layer indication, or in subsequent RRC signaling).

As shown by reference number 460, the UE may generate the RLC status report having the indicated format (e.g., based at least in part on receiving the physical layer indication or the MAC layer indication). The UE may select the format for one or more RLC status reports (e.g., based at least in part on the physical layer indication or the MAC layer indication of the format). In some aspects, the UE may select the format for the one or more RLC status reports from a first format that is configured to indicate a sequence number of a downlink transmission using a relatively small bit count (e.g., using a 12-bit sequence number) and a second format that is configured to indicate a sequence number of a downlink transmission using a relatively large bit count (e.g., using an 18-bit sequence number).

As shown by reference number 470, the UE may transmit, and the base station may receive, one or more RLC status reports using the selected format (e.g., selected based at least in part on the physical layer indication or the MAC layer indication). In some aspects, the UE may transmit the one or more additional RLC status reports with the format based at least in part on the physical layer indication or the MAC layer indication. For example, the UE may be configured to apply the format for a configured number of slots, a configured number of RLC status reports, and/or a configured amount of time, among other examples. Additionally, or alternatively, the UE may apply the format for a configured number of slots, a configured number of RLC status reports, and/or a configured amount of time, among other examples, based at least in part on an indication associated with the physical layer indication (e.g., in a same DCI message) or associated with the MAC layer indication.

In some aspects, the format may include a MAC layer signaling format. In other words, the UE may transmit the one or more RLC status reports using MAC layer signaling.

As shown by reference number 480, the UE may transmit, and the base station may receive, a request to change from the indicated format. For example, the UE may request to change from the indicated format based at least in part on one or more radio conditions or detection of a failure of the base station to receive a previous RLC report, among other examples.

As shown by reference number 490, the base station may transmit, and the UE may receive, an indication to use a different format for one or more subsequent RLC status reports. In some aspects, the UE may receive the indication to use the different format based at least in part on transmission of the request to change from the indicated format. In some aspects, the base station may determine to use the different format based at least in part on one or more radio conditions, detection of a failure of the base station to receive a previous RLC report, or network traffic, among other examples.

In this way, the RLC status report may be configured with a format to improve a transmission range (e.g., based at least in part on the base station determining that the transmission range should be increased for the base station to receive the RLC status report). In this way, the base station may receive the RLC status report when the UE is outside of a transmission range for transmitting the RLC status report with a relatively large payload, which may conserve computing, communication, and/or network resources that may otherwise be consumed based at least in part on the base station making an incorrect assumption of ARQ feedback.

As indicated above, FIG. 4 is provided as an example. Other examples may differ from what is described with respect to FIG. 4.

Figure 5:
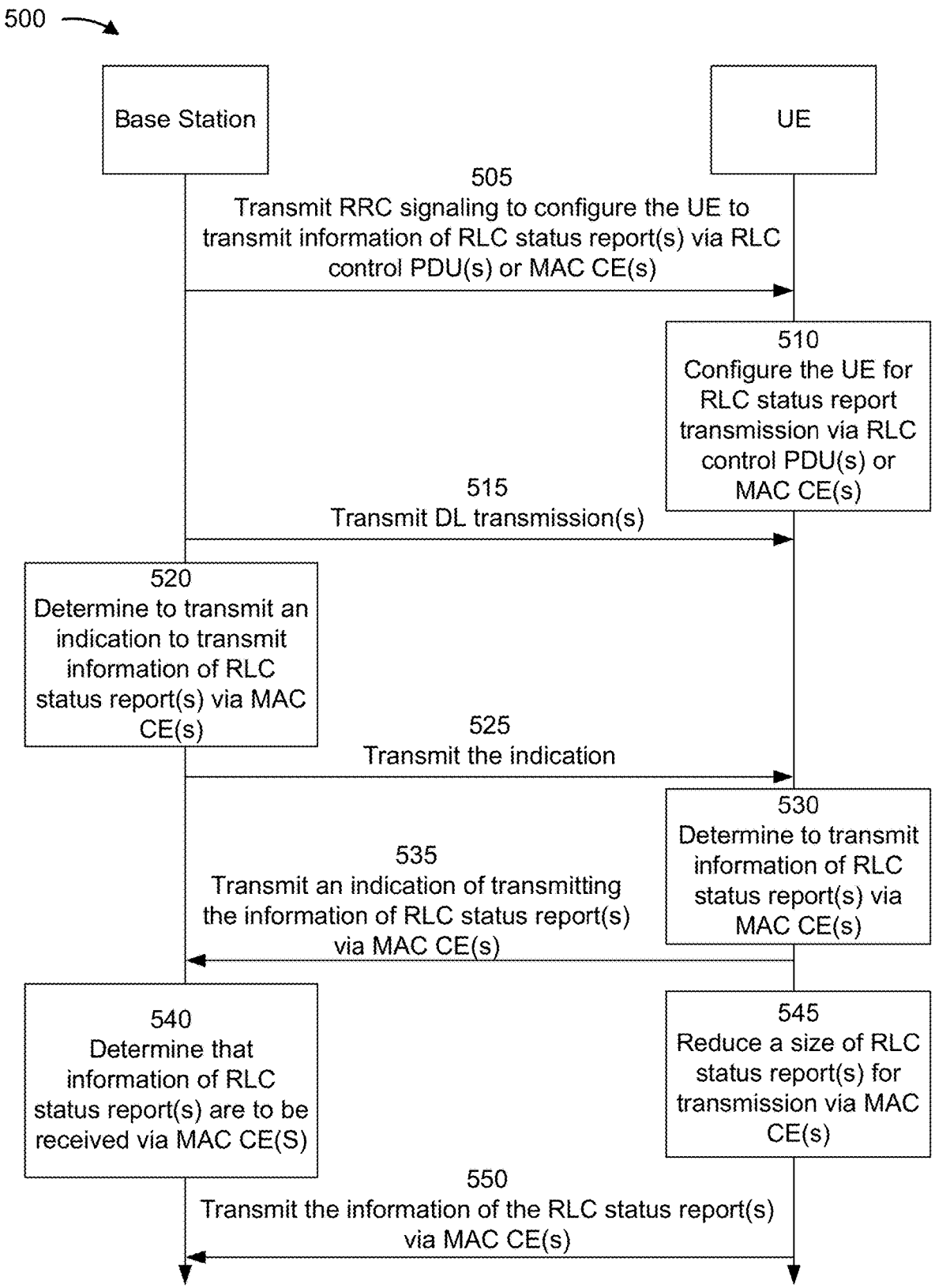
FIG. 5 is a diagram illustrating an example of range extension for RLC status reporting, in accordance with the present disclosure.

FIG. 5 is a diagram illustrating an example 500 of range extension for RLC status reporting, in accordance with the present disclosure. As shown, a UE (e.g., UE 120) and a base station (e.g., base station 110) may communicate using one or more of downlink transmissions and uplink transmissions. In some aspects, the base station and the UE may be part of a wireless network (e.g., the wireless network 100). In some aspects, the UE and the base station may communicate using a cell group over one or more frequency bands on FR2 or other relatively high frequency bands. In some aspects, a downlink transmission range using the cell group may be greater than an uplink transmission range using the cell group (e.g., based at least in part on an MPE requirement, a configuration of the UE, and/or the like).

As shown in FIG. 5, and by reference number 505, the base station may transmit RRC signaling to configure the UE to transmit information of one or more RLC status reports via one or more RLC control PDUs or one or more MAC CEs. In some aspects, the RRC signaling may include instructions for reducing a size of, and/or compressing, the information of the RLC status report for transmission via the one or more MAC CEs. In some aspects, the RRC signaling may indicate a format for the one or more MAC CEs for transmitting the information of the RLC status report.

As shown by reference number 510, the UE may configure the UE based at least in part on the RRC signaling. In some aspects, the UE may be configured to select transmitting the information of the RLC status report via one or more RLC control PDUs or via one or more MAC CEs based at least in part on one or more parameters. The one or more parameters may include an indication from the base station, a downlink data rate for downlink transmissions to the UE, an estimated size of the RLC status report (e.g., as estimated by the base station and indicated to the UE), an RLC packet error rate for downlink transmissions to the UE, uplink transmission conditions, and/or the like. For example, the UE may be configured to select transmitting the information of the RLC status report based at least in part on one or more parameters that indicate that a payload of the RLC status report is relatively large, that indicate that the uplink channel conditions are relatively poor, and/or the like.

As shown by reference number 515, the base station may transmit one or more downlink transmissions to the UE. The one or more downlink transmissions may include one or more control plane downlink transmissions (e.g., RLC downlink transmissions), one or more user plane downlink transmissions, and/or the like. The UE may attempt to receive the one or more downlink transmissions and may determine ARQ feedback for the one or more downlink transmissions. In some aspects, the UE may generate information of an RLC status report for transmission to the base station to indicate the ARQ feedback.

As shown by reference number 520, the base station may determine to transmit an indication for the UE to transmit the information of one or more RLC status reports via one or more MAC CEs. The base station may determine to transmit the indication based at least in part on one or more parameters. The one or more parameters may include a request from the UE, a downlink data rate for downlink transmissions to the UE, an estimated size of the RLC status report, an RLC packet error rate for downlink transmissions to the UE, uplink transmission conditions, and/or the like.

As shown by reference number 525, the base station may transmit the indication to transmit the information of the RLC status report via one or more MAC CEs. In some aspects, the base station may transmit the indication to indicate that the UE is to select transmitting the one or more MAC CEs for transmitting the RLC status report, as configured based at least in part on the RRC signaling.

As shown by reference number 530, the UE may determine to transmit information of the one or more RLC status reports via one or more MAC CEs. In some aspects, the UE may determine to transmit the information of the one or more RLC status reports via the one or more MAC CEs based at least in part on the indication from the base station. In some aspects, the UE may determine to transmit the information of the one or more RLC status reports via the one or more MAC CEs autonomously, and/or may not receive the indication from the base station. In some aspects, the UE may determine to transmit the information of the one or more RLC status reports via the one or more MAC CEs based at least in part on one or more parameters. The one or more parameters may include an indication from the base station, a downlink data rate for downlink transmissions to the UE, an estimated size of the RLC status report, an RLC packet error rate for downlink transmissions to the UE, uplink transmission conditions, and/or the like.

As shown by reference number 535, the UE may transmit an indication to the base station to indicate that the UE has determined to transmit the one or more RLC status reports via one or more MAC CEs. In some aspects, the indication may include a confirmation of the indication from the base station, as shown by reference number 525.

As shown by reference number 540, the base station may determine that the information of the one or more RLC status reports are to be received via one or more MAC CEs (e.g., based at least in part on the indication received from the UE as shown by reference number 535). In some aspects, the base station may determine to inspect one or more MAC CEs of a subsequent uplink transmission for the information of the RLC status report.

In some aspects, the base station may determine that the information of the one or more RLC status reports are to be received via the one or more MAC CEs based at least in part on the indication from the UE, as shown by reference number 535. In some aspects, the base station may determine that the information of the one or more RLC status reports are to be received via the one or more MAC CEs based at least in part on the determination, as shown by reference number 520, and/or the indication transmitted to the UE, as shown by reference number 535. In some aspects, the base station may determine that the information of the one or more RLC status reports are to be received via the one or more MAC CEs without, or independently from, receiving the indication from the UE.

As shown by reference number 545, the UE may reduce a size of the RLC status report for transmission via the one or more MAC CEs. In some aspects, the UE may omit one or more ACKs or NACKs from the information from the RLC status report. In some aspects, the UE may compress the information from the RLC status report to reduce the size of the RLC status report. In some aspects, the UE may use a fixed size for the one or more MAC CEs. This may allow the UE to reduce a header size for the MAC CE (e.g., using a single bit and/or omitting a bit that may otherwise be used to indicate a size of the one or more MAC CEs).

As shown by reference number 550, the UE may transmit the information of the one or more RLC status reports via the one or more MAC CEs. In some aspects, the information of the one or more RLC status reports may include a reduced-size RLC status report.

In this way, the information of the RLC status report may be transmitted in a way that improves a transmission range (e.g., based at least in part on the base station determining that the transmission range should be increased for the base station to receive the RLC status report). In this way, the base station may receive the RLC status report when the UE is outside of a transmission range for transmitting the RLC status report using an RLC control PDU, which may conserve computing, communication, and/or network resources that may otherwise be consumed based at least in part on the base station making an incorrect assumption of ARQ feedback.

As indicated above, FIG. 5 is provided as an example. Other examples may differ from what is described with respect to FIG. 5.

Figure 6:
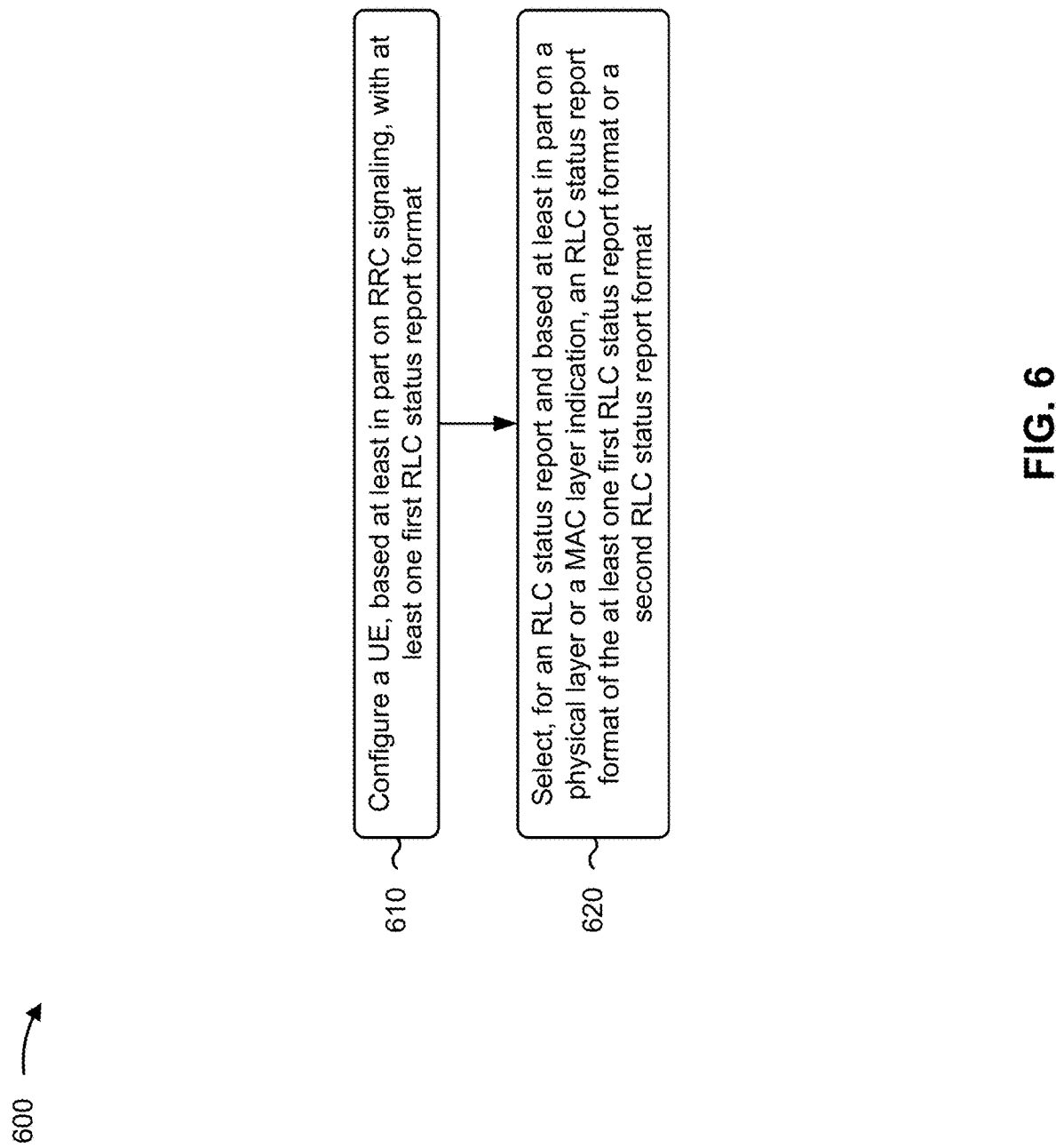
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 110 and/or the like) performs operations associated with range extension for RLC status reporting.

As shown in FIG. 6, in some aspects, process 600 may include configuring the UE, based at least in part on RRC signaling, with at least one first RLC status report format (block 610). For example, the UE (e.g., using controller/processor 280, transmit processor 264, TX MIMO processor 266, MOD 254, antenna 252, and/or the like) may configure the UE, based at least in part on RRC signaling, with at least one first RLC status report format, as described above.

As further shown in FIG. 6, in some aspects, process 600 may include selecting, for an RLC status report and based at least in part on a physical layer indication or a MAC layer indication, an RLC status report format of the at least one first RLC status report format or a second RLC status report format (block 620). For example, the UE (e.g., using controller/processor 280 and/or the like) may select, for an RLC status report and based at least in part on a physical layer indication or a MAC layer indication, an RLC status report format of the at least one first RLC status report format or a second RLC status report format, as described above.

Process 600 may include additional aspects, such as any single aspect or any combination of aspects described below and/or in connection with one or more other processes described elsewhere herein.

In a first aspect, the at least one first RLC status report format and the second RLC status format collectively include an RLC status report format configured to indicate a sequence number of a downlink transmission using a 12-bit sequence number, and another RLC status report format configured to indicate a sequence number of a downlink transmission using an 18-bit sequence number.

In a second aspect, alone or in combination with the first aspect, process 600 includes receiving one or more MAC CEs that include the physical layer indication or the MAC layer indication or receiving DCI that includes the physical layer indication or the MAC layer indication.

In a third aspect, alone or in combination with one or more of the first and second aspects, process 600 includes transmitting the RLC status report with the RLC status report format of the at least one first RLC status report format or the second RLC status report format based at least in part on the physical layer indication or the MAC layer indication.

In a fourth aspect, alone or in combination with one or more of the first through third aspects, process 600 includes transmitting one or more additional RLC status reports with the RLC status report format of the at least one first RLC status report format or the second RLC status report format based at least in part on the physical layer indication or the MAC layer indication.

In a fifth aspect, alone or in combination with one or more of the first through fourth aspects, the RLC status report is associated with a cell group on FR2.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
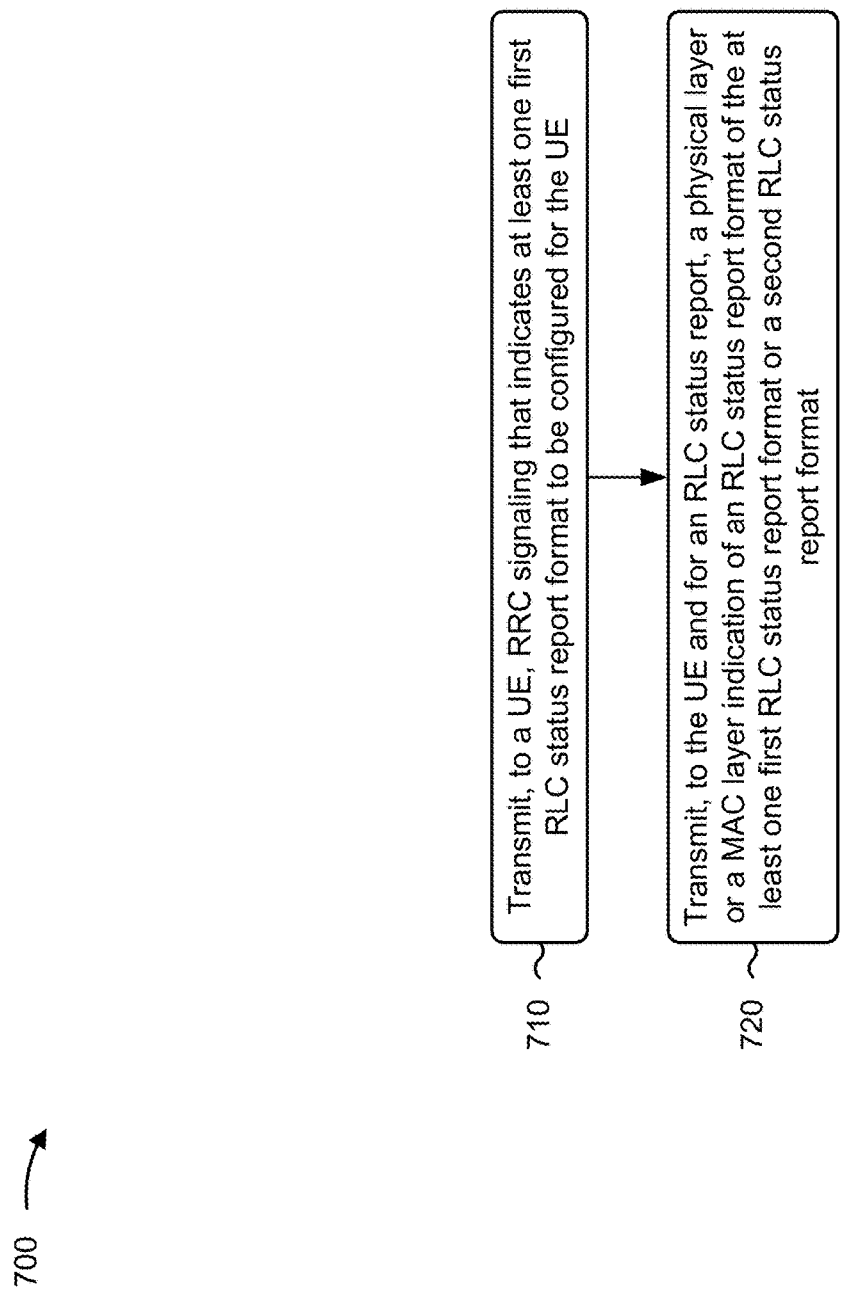
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 120 and/or the like) performs operations associated with range extension for radio link control status reporting.

As shown in FIG. 7, in some aspects, process 700 may include transmitting, to a UE, RRC signaling that indicates at least one first RLC status report format to be configured for the UE (block 710). For example, the base station (e.g., using controller/processor 240, transmit processor 220, TX MIMO processor 230, MOD 232, antenna 234, and/or the like) may transmit, to a UE, RRC signaling that indicates at least one first RLC status report format to be configured for the UE, as described above.

As further shown in FIG. 7, in some aspects, process 700 may include transmitting, to the UE and for an RLC status report, a physical layer indication or a MAC layer indication of an RLC status report format of the at least one first RLC status report format or a second RLC status report format (block 720). For example, the base station (e.g., using controller/processor 240, transmit processor 220, TX MIMO processor 230, MOD 232, antenna 234, and/or the like) may transmit, to the UE and for an RLC status report, a physical layer indication or a MAC layer indication of an RLC status report format of the at least one first RLC status report format or a second RLC status report format, as described above.

Process 700 may include additional aspects, such as any single aspect or any combination of aspects described below and/or in connection with one or more other processes described elsewhere herein.

In a first aspect, process 700 includes selecting the RLC status report format based at least in part on one or more of a downlink data rate for downlink transmissions to the UE, an estimated size of the RLC status report, an RLC packet error rate for downlink transmissions to the UE, uplink transmission conditions, or some combination thereof.

In a second aspect, alone or in combination with the first aspect, the at least one first RLC status report format and the second RLC status format collectively include an RLC status report format configured to indicate a sequence number of a downlink transmission using a 12-bit sequence number, and another RLC status report format configured to indicate a sequence number of a downlink transmission using an 18-bit sequence number.

In a third aspect, alone or in combination with one or more of the first and second aspects, process 700 includes transmitting the physical layer indication or the MAC layer indication via one or more of a MAC CE or DCI.

In a fourth aspect, alone or in combination with one or more of the first through third aspects, process 700 includes receiving the RLC status report with the RLC status report format of the at least one first RLC status report format or the second RLC status report format transmitted based at least in part on the physical layer indication or the MAC layer indication.

In a fifth aspect, alone or in combination with one or more of the first through fourth aspects, the RLC status report is associated with a cell group on FR2.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
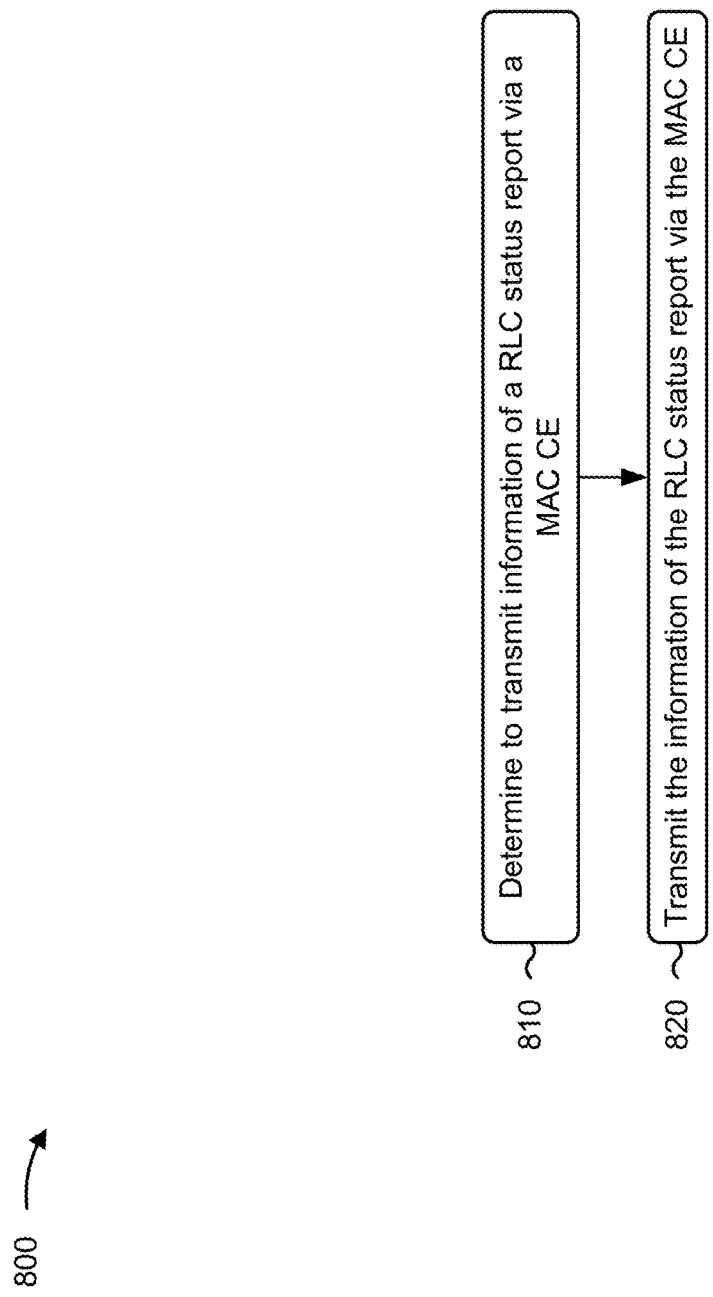
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with range extension for radio link control status reporting.

As shown in FIG. 8, in some aspects, process 800 may include determining to transmit information of an RLC status report via a MAC CE (block 810). For example, the UE (e.g., using controller/processor 280 and/or the like) may determine to transmit information of an RLC status report via a MAC CE, as described above.

As further shown in FIG. 8, in some aspects, process 800 may include transmitting the information of the RLC status report via the MAC CE (block 820). For example, the UE (e.g., using controller/processor 280, transmit processor 264, TX MIMO processor 266, MOD 254, antenna 252, and/or the like) may transmit the information of the RLC status report via the MAC CE, as described above.

Process 800 may include additional aspects, such as any single aspect or any combination of aspects described below and/or in connection with one or more other processes described elsewhere herein.

In a first aspect, the information of the RLC status report comprises a reduced-size RLC status report, and transmitting the information of the RLC status report via the MAC CE includes transmitting the reduced-sized RLC status report via the MAC CE.

In a second aspect, alone or in combination with the first aspect, the MAC CE has a fixed size, and the MAC CE uses a single bit for a header.

In a third aspect, alone or in combination with one or more of the first and second aspects, the UE is configured to select at least one of transmitting the information of the RLC status report via an RLC control packet data unit or transmitting the information of the RLC status report via the MAC CE, and determining to transmit information of the RLC status report via the MAC CE is based at least in part on one or more of an indication from a base station, a downlink data rate for downlink transmissions to the UE, an estimated size of the RLC status report, an RLC packet error rate for downlink transmissions to the UE, uplink transmission conditions, or some combination thereof.

In a fourth aspect, alone or in combination with one or more of the first through third aspects, the RLC status report is associated with a cell group on FR2.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
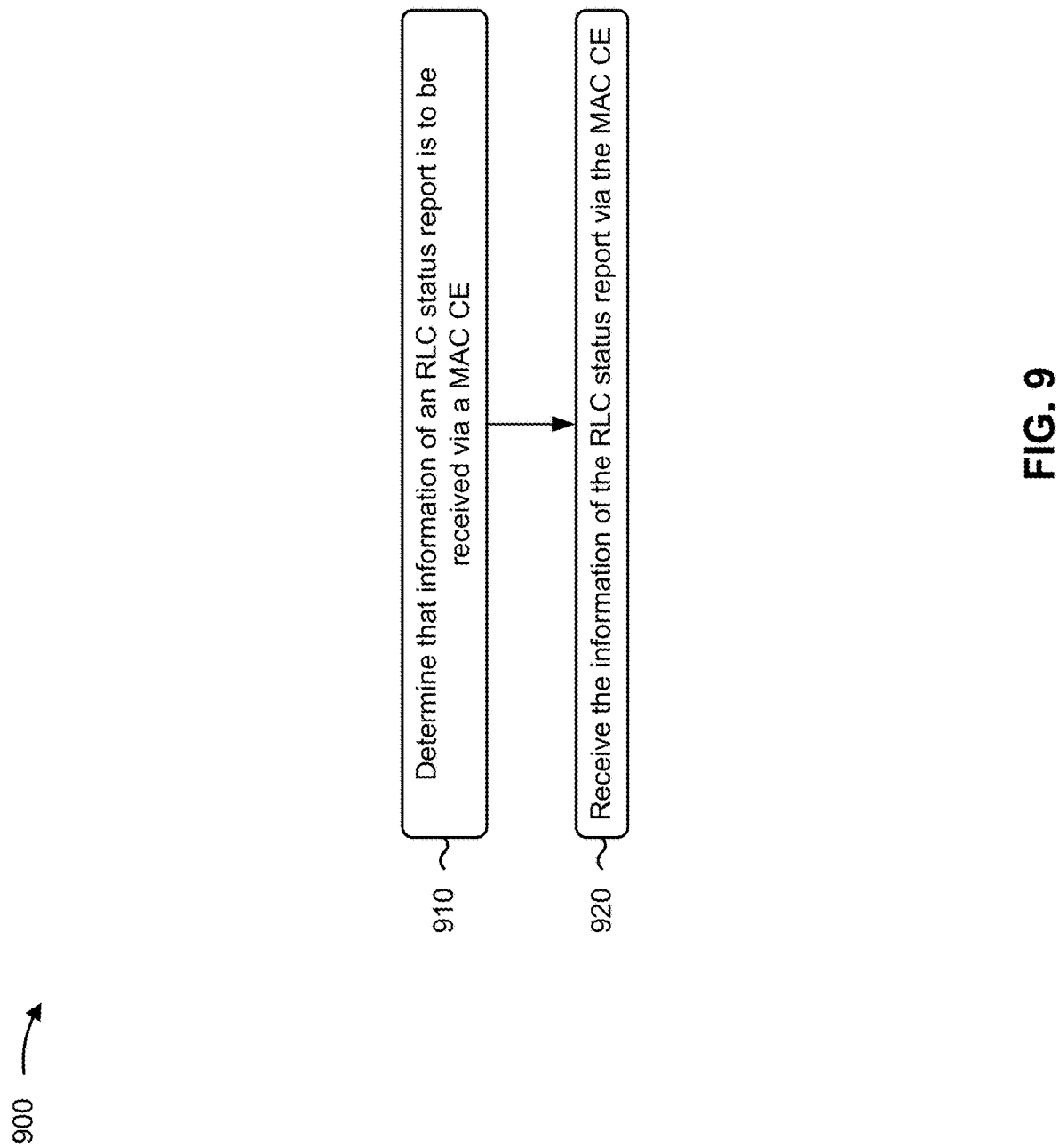
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the UE (e.g., base station 110 and/or the like) performs operations associated with range extension for radio link control status reporting.

As shown in FIG. 9, in some aspects, process 900 may include determining that information of an RLC status report is to be received via a MAC CE (block 910). For example, the base station (e.g., using antenna 234, DEMOD 232, MIMO detector 236, receive processor 238, controller/processor 240, and/or the like) may determine that information of an RLC status report is to be received via a MAC CE, as described above.

As further shown in FIG. 9, in some aspects, process 900 may include receiving the information of the RLC status report via the MAC CE (block 920). For example, the base station (e.g., using antenna 234, DEMOD 232, MIMO detector 236, receive processor 238, controller/processor 240, and/or the like) may receive the information of the RLC status report via the MAC CE, as described above.

Process 900 may include additional aspects, such as any single aspect or any combination of aspects described below and/or in connection with one or more other processes described elsewhere herein.

In a first aspect, process 900 includes transmitting, to a UE associated with the information of the RLC status report, an indication to transmit the information of the RLC status report via the MAC CE.

In a second aspect, alone or in combination with the first aspect, process 900 includes determining to transmit the indication based at least in part on one or more of: a is requesting from a UE, a downlink data rate for downlink transmissions to the UE, an estimated size of the RLC status report, an RLC packet error rate for downlink transmissions to the UE, uplink transmission conditions, or some combination thereof.

In a third aspect, alone or in combination with one or more of the first and second aspects, determining that the information of the RLC status report is to be received via the MAC CE includes determining that the information of the RLC status report is to be received via the MAC CE based at least in part on an indication from a UE.

In a fourth aspect, alone or in combination with one or more of the first through third aspects, the MAC CE has a fixed size, and the MAC CE uses a single bit for a header.

In a fifth aspect, alone or in combination with one or more of the first through fourth aspects, the RLC status report is associated with a cell group on FR2.

In a sixth aspect, alone or in combination with one or more of the first through fifth aspects, the information of the RLC status report comprises a reduced-size RLC status report, and receiving the information of the RLC status report via the MAC CE includes receiving the reduced-sized RLC status report via the MAC CE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
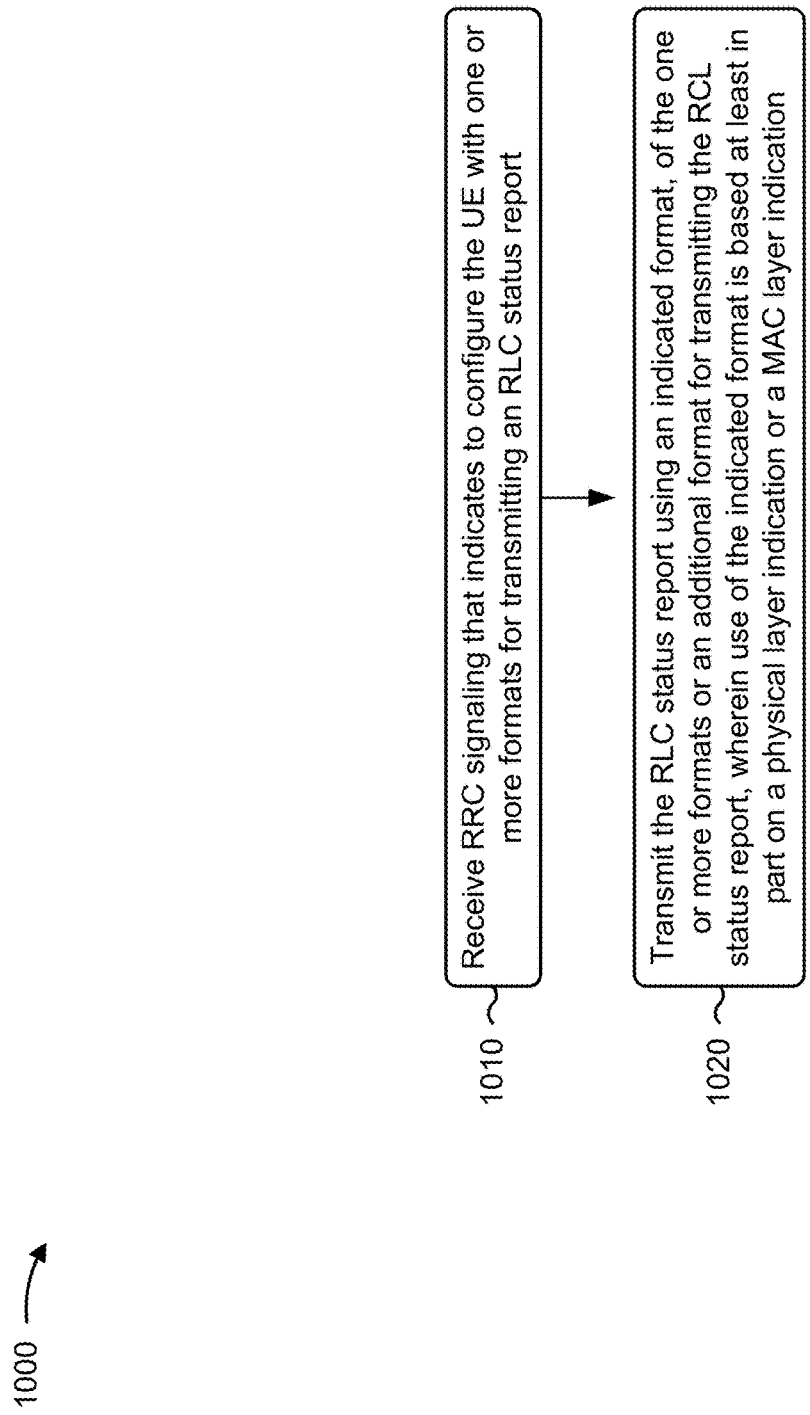
FIG. 10 is a diagram illustrating an example process performed, for example, by a user equipment, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with range extension for radio link control status reporting.

As shown in FIG. 10, in some aspects, process 1000 may include receiving RRC signaling that indicates to configure the UE with one or more formats for transmitting a RLC status report (block 1010). For example, the UE (e.g., using antenna 234, DEMOD 232, MIMO detector 236, receive processor 238, or controller/processor 240, among other examples) may receive RRC signaling that indicates to configure the UE with one or more formats for transmitting a RLC status report, as described above.

As further shown in FIG. 10, in some aspects, process 1000 may include transmitting the RLC status report using an indicated format, of the one or more formats or an additional format for transmitting the RLC status report, wherein use of the indicated format is based at least in part on a physical layer indication or a MAC layer indication (block 1020). For example, the UE (e.g., using controller/processor 240, transmit processor 220, TX MIMO processor 230, MOD 232, or antenna 234, among other examples) may transmit the RLC status report using an indicated format, of the one or more formats or an additional format for transmitting the RLC status report, wherein use of the indicated format is based at least in part on a physical layer indication or a MAC layer indication, as described above.

Process 1000 may include additional aspects, such as any single aspect or any combination of aspects described below and/or in connection with one or more other processes described elsewhere herein.

In a first aspect, transmitting the RLC status report using the indicated format comprises transmitting the RLC status report using a MAC layer signaling format.

In a second aspect, alone or in combination with the first aspect, the one or more formats comprise a first format configured to indicate a sequence number of a downlink transmission using a 12-bit sequence number, and a second format configured to indicate a sequence number of a downlink transmission using an 18-bit sequence number.

In a third aspect, alone or in combination with one or more of the first and second aspects, process 1000 includes one or more of receiving one or more MAC control elements that include the MAC layer indication, or receiving downlink control information that includes the physical layer indication.

In a fourth aspect, alone or in combination with one or more of the first through third aspects, process 1000 includes transmitting one or more additional RLC status reports using the indicated format based at least in part on the physical layer indication or the MAC layer indication.

In a fifth aspect, alone or in combination with one or more of the first through fourth aspects, process 1000 includes receiving an indication to use a different format for transmitting a subsequent RLC status report.

In a sixth aspect, alone or in combination with one or more of the first through fifth aspects, process 1000 includes transmitting a request to change from the indicated format for transmitting the subsequent RLC status report, wherein reception of the indication to use the different format for transmitting the subsequent RLC status report is based at least in part on transmission of the request to change from the indicated format for transmitting the subsequent RLC status report.

In a seventh aspect, alone or in combination with one or more of the first through sixth aspects, the RLC status report is associated with a cell group on frequency range 2.

In an eighth aspect, alone or in combination with one or more of the first through seventh aspects, process 1000 includes configuring the UE, based at least in part on receiving the RRC signaling, with the one or more formats.

In a ninth aspect, alone or in combination with one or more of the first through eighth aspects, process 1000 includes generating the RLC status report having the indicated format based at least in part on receiving the physical layer indication or the MAC layer indication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: receiving radio resource control (RRC) signaling that indicates to configure the UE with one or more formats for transmitting a radio link control (RLC) status report; and transmitting the RLC status report using an indicated format, of the one or more formats or an additional format for transmitting the RLC status report, wherein use of the indicated format is based at least in part on a physical layer indication or a medium access control (MAC) layer indication.

Aspect 2: The method of Aspect 1, wherein transmitting the RLC status report using the indicated format comprises: transmitting the RLC status report using a MAC layer signaling format.

Aspect 3: The method of any of Aspects 1 through 2, wherein the one or more formats comprise: a first format configured to indicate a sequence number of a downlink transmission using a 12-bit sequence number, and a second format configured to indicate a sequence number of a downlink transmission using an 18-bit sequence number.

Aspect 4: The method of any of Aspects 1 through 3, further comprising one or more of: receiving one or more MAC control elements that include the MAC layer indication, or receiving downlink control information that includes the physical layer indication.

Aspect 5: The method of Aspect 4, further comprising: transmitting one or more additional RLC status reports using the indicated format based at least in part on the physical layer indication or the MAC layer indication.

Aspect 6: The method of Aspect 5, further comprising: receiving an indication to use a different format for transmitting a subsequent RLC status report.

Aspect 7: The method of Aspect 6, further comprising: transmitting a request to change from the indicated format for transmitting the subsequent RLC status report, wherein reception of the indication to use the different format for transmitting the subsequent RLC status report is based at least in part on transmission of the request to change from the indicated format for transmitting the subsequent RLC status report.

Aspect 8: The method of any of Aspects 1 through 7, wherein the RLC status report is associated with a cell group on frequency range 2.

Aspect 9: The method of any of Aspects 1 through 8, further comprising: configuring the UE, based at least in part on receiving the RRC signaling, with the one or more formats.

Aspect 10: The method of any of Aspects 1 through 9, further comprising: generating the RLC status report having the indicated format based at least in part on receiving the physical layer indication or the MAC layer indication.

Aspect 11: An apparatus for wireless communication at a device, comprising a processor; memory coupled with the processor; and instructions stored in the memory and executable by the processor to cause the apparatus to perform the method of one or more Aspects of Aspects 1-10.

Aspect 12: A device for wireless communication, comprising a memory and one or more processors coupled to the memory, the memory and the one or more processors configured to perform the method of one or more Aspects of Aspects 1-10.

Aspect 13: An apparatus for wireless communication, comprising at least one means for performing the method of one or more Aspects of Aspects 1-10.

Aspect 14: A non-transitory computer-readable medium storing code for wireless communication, the code comprising instructions executable by a processor to perform the method of one or more Aspects of Aspects 1-10.

Aspect 15: A non-transitory computer-readable medium storing a set of instructions for wireless communication, the set of instructions comprising one or more instructions that, when executed by one or more processors of a device, cause the device to perform the method of one or more Aspects of Aspects 1-10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving radio resource control (RRC) signaling that indicates to configure the UE with one or more formats for transmitting a radio link control (RLC) status report, wherein the RLC status report is associated with a cell group on a millimeter wave frequency band and wherein the one or more formats comprise:
      a first format configured to indicate a sequence number of a downlink transmission using a first bit count, or
      a second format configured to indicate a sequence number of a downlink transmission using a second bit count that is larger than the first bit count;
   receiving a physical layer indication or a medium access control (MAC) layer indication that indicates a format for the UE to use for the RLC status report, the indicated format being one of the one or more formats identified in the RRC signaling or an additional format not identified in the RRC signaling; and
   transmitting the RLC status report using the indicated format.

2. The method of claim 1, wherein transmitting the RLC status report using the indicated format comprises:
   transmitting the RLC status report using a MAC layer signaling format.

3. The method of claim 1, wherein the first format configured to indicate a sequence number of a downlink transmission using a 12-bit sequence number as the first bit count, and the second format configured to indicate a sequence number of a downlink transmission using an 18-bit sequence number as the second bit count.

4. The method of claim 1, wherein receiving the physical layer indication or the medium access control (MAC) layer indication comprises one or more of:
   receiving one or more MAC control elements that include the MAC layer indication, or
   receiving downlink control information that includes the physical layer indication.

5. The method of claim 4, further comprising:
   transmitting one or more additional RLC status reports using the indicated format based at least in part on the physical layer indication or the MAC layer indication.

6. The method of claim 5, further comprising:
   receiving an indication to use a different format for transmitting a subsequent RLC status report.

7. The method of claim 6, further comprising:
   transmitting a request to change from the indicated format for transmitting the subsequent RLC status report,
      wherein reception of the indication to use the different format for transmitting the subsequent RLC status report is based at least in part on transmission of the request to change from the indicated format for transmitting the subsequent RLC status report.

8. The method of claim 1, wherein the cell group on the millimeter wave frequency band corresponds to a cell group on frequency range 2.

9. The method of claim 1, further comprising:
   configuring the UE, based at least in part on receiving the RRC signaling, with the one or more formats.

10. The method of claim 1, further comprising:
    generating the RLC status report having the indicated format based at least in part on receiving the physical layer indication or the MAC layer indication.

11. A user equipment (UE) for wireless communication, comprising:
    one or more memories; and
    one or more processors coupled to the one or more memories, the one or more processors configured to:
       receive radio resource control (RRC) signaling that indicates to configure the UE with one or more formats for transmitting a radio link control (RLC) status report, wherein the RLC status report is associated with a cell group on a millimeter wave frequency band and wherein the one or more formats comprise:
          a first format configured to indicate a sequence number of a downlink transmission using a first bit count, or
          a second format configured to indicate a sequence number of a downlink transmission using a second bit count that is larger than the first bit count;
       receive a physical layer indication or a medium access control (MAC) layer indication that indicates a format for the UE to use for the RLC status report, the indicated format being one of the one or more formats identified in the RRC signaling or an additional format not identified in the RRC signaling; and
       transmit the RLC status report using the indicated format.

12. The UE of claim 11, wherein the one or more processors, when transmitting the RLC status report using the indicated format, are configured to:
    transmit the RLC status report using a MAC layer signaling format.

13. The UE of claim 11, wherein the first format is configured to indicate a sequence number of a downlink transmission using a 12-bit sequence number as the first bit count, and the second format is configured to indicate a sequence number of a downlink transmission using an 18-bit sequence number as the second bit count.

14. The UE of claim 11, wherein the one or more processors, when receiving the physical layer indication or the MAC layer indication, are configured to:
    receive one or more MAC control elements that include the MAC layer indication, or receive downlink control information that includes the physical layer indication.

15. The UE of claim 14, wherein the one or more processors are further configured to:
transmit one or more additional RLC status reports using the indicated format based at least in part on the physical layer indication or the MAC layer indication.

16. The UE of claim 15, wherein the one or more processors are further configured to:
receive an indication to use a different format for transmitting a subsequent RLC status report.

17. The UE of claim 16, wherein the one or more processors are further configured to:
transmit a request to change from the indicated format for transmitting the subsequent RLC status report,
wherein reception of the indication to use the different format for transmitting the subsequent RLC status report is based at least in part on transmission of the request to change from the indicated format for transmitting the subsequent RLC status report.

18. The UE of claim 11, wherein the cell group on the millimeter wave frequency band corresponds to a cell group on frequency range 2.

19. The UE of claim 11, wherein the one or more processors are further configured to:
configure the UE, based at least in part on receiving the RRC signaling, with the one or more formats.

20. The UE of claim 11, wherein the one or more processors are further configured to:
generate the RLC status report having the indicated format based at least in part on receiving the physical layer indication or the MAC layer indication.

21. A non-transitory computer-readable medium storing a set of instructions for wireless communication, the set of instructions comprising:
one or more instructions that, when executed by one or more processors of a user equipment (UE), cause the UE to:
receive radio resource control (RRC) signaling that indicates to configure the UE with one or more formats for transmitting a radio link control (RLC) status report, wherein the RLC status report is associated with a cell group on a millimeter wave frequency band and wherein the one or more formats comprise:
a first format configured to indicate a sequence number of a downlink transmission using a first bit count, or
a second format configured to indicate a sequence number of a downlink transmission using a second bit count that is larger than the first bit count;
receive a physical layer indication or a medium access control (MAC) layer indication that indicates a format for the UE to use for the RLC status report, the indicated format being one of the one or more formats identified in the RRC signaling or an additional format not identified in the RRC signaling; and
transmit the RLC status report using the indicated format.

22. The non-transitory computer-readable medium of claim 21, wherein the one or more instructions, that cause the UE to transmit the RLC status report using the indicated format, cause the UE to:
transmit the RLC status report using a MAC layer signaling format.

23. The non-transitory computer-readable medium of claim 21, wherein the first format is configured to indicate a sequence number of a downlink transmission using a 12-bit sequence number as the first bit count, and the second format is configured to indicate a sequence number of a downlink transmission using an 18-bit sequence number as the second bit count.

24. The non-transitory computer-readable medium of claim 21, wherein the one or more instructions further cause the UE to:
transmit one or more additional RLC status reports using the indicated format based at least in part on the physical layer indication or the MAC layer indication.

25. The non-transitory computer-readable medium of claim 21, wherein the one or more instructions further cause the UE to:
generate the RLC status report having the indicated format based at least in part on receiving the physical layer indication or the MAC layer indication.

26. An apparatus for wireless communication, comprising:
means for receiving radio resource control (RRC) signaling that indicates to configure the apparatus with one or more formats for transmitting a radio link control (RLC) status report, wherein the RLC status report is associated with a cell group on a millimeter wave frequency band and wherein the one or more formats comprise:
a first format configured to indicate a sequence number of a downlink transmission using a first bit count, or
a second format configured to indicate a sequence number of a downlink transmission using a second bit count that is larger than the first bit count;
means for receiving a physical layer indication or a medium access control (MAC) layer indication that indicates a format for the apparatus to use for the RLC status report, the indicated format being one of the one or more formats identified in the RRC signaling or an additional format not identified in the RRC signaling; and
means for transmitting the RLC status report using the indicated format.

27. The apparatus of claim 26, wherein the means for transmitting the RLC status report using the indicated format comprises:
means for transmitting the RLC status report using a MAC layer signaling format.

28. The apparatus of claim 26, wherein the first format is configured to indicate a sequence number of a downlink transmission using a 12-bit sequence number as the first bit count, and the second format is configured to indicate a sequence number of a downlink transmission using an 18-bit sequence number as the second bit count.

29. The apparatus of claim 26, further comprising:
means for transmitting one or more additional RLC status reports using the indicated format based at least in part on the physical layer indication or the MAC layer indication.

30. The apparatus of claim 26, further comprising:
means for generating the RLC status report having the indicated format based at least in part on receiving the physical layer indication or the MAC layer indication.

* * * * *